United States Patent
Lee et al.

(10) Patent No.: US 12,296,469 B2
(45) Date of Patent: May 13, 2025

(54) DEVICE OF BRAKE CONTROLLING AND ROBOT INCLUDING THEREOF

(71) Applicant: LG ELECTRONICS INC., Seoul (KR)

(72) Inventors: Byunghyuk Lee, Seoul (KR); Jong Kwon Yi, Seoul (KR); Sun Uk Kim, Seoul (KR); Chun Ho Cho, Seoul (KR); Keunsik No, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 173 days.

(21) Appl. No.: 18/013,758

(22) PCT Filed: Sep. 18, 2020

(86) PCT No.: PCT/KR2020/012642
§ 371 (c)(1),
(2) Date: Dec. 29, 2022

(87) PCT Pub. No.: WO2022/010034
PCT Pub. Date: Jan. 13, 2022

(65) Prior Publication Data
US 2023/0294310 A1    Sep. 21, 2023

(30) Foreign Application Priority Data

Jul. 10, 2020   (KR) .................. 10-2020-0085662

(51) Int. Cl.
*B25J 19/00*   (2006.01)
*B25J 5/00*   (2006.01)
*B25J 9/16*   (2006.01)

(52) U.S. Cl.
CPC .......... *B25J 19/0004* (2013.01); *B25J 5/007* (2013.01); *B25J 9/1697* (2013.01); *B25J 19/005* (2013.01)

(58) Field of Classification Search
CPC ...... B25J 19/0004; B25J 5/007; B25J 9/1697; B25J 19/005; B25J 9/101; B25J 9/16;
(Continued)

(56) References Cited

U.S. PATENT DOCUMENTS

2007/0024112 A1* 2/2007 Lindqvist .............. B60T 13/741
                                                             303/122.04
2017/0210361 A1* 7/2017 Kotera .................. F16D 55/226
(Continued)

FOREIGN PATENT DOCUMENTS

JP      2013-169616      9/2013
KR      10-0797127       1/2008
(Continued)

OTHER PUBLICATIONS

PCT International Application No. PCT/KR2020/012642, International Search Report dated Mar. 15, 2021, 5 pages.
(Continued)

*Primary Examiner* — Harry Y Oh
(74) *Attorney, Agent, or Firm* — LEE, HONG, DEGERMAN, KANG & WAIMEY

(57) ABSTRACT

The present invention relates to a brake control device and a robot including same. A robot according to an embodiment of the present invention comprises: a normal power-supplying unit for supplying electric energy required to move and operate the robot; a brake module for braking or unbraking a motor that moves the robot; an emergency power-supplying unit which receives and stores electric energy from the normal power-supplying unit, and supplies the stored electric energy to the brake module when the supply of the electric energy from the normal power-supplying unit is cut off; and a control processor which applies, to the brake
(Continued)

module, a signal for controlling the supply of the electric energy, and controls the movement and operation of the robot.

14 Claims, 14 Drawing Sheets

(58) Field of Classification Search
CPC ....... B25J 13/08; B25J 19/02; B60L 2200/40; B60L 1/00; B60L 3/0046; B60L 3/0092; B60L 7/18; B60L 15/2009
See application file for complete search history.

(56) References Cited

U.S. PATENT DOCUMENTS

| | | | | |
|---|---|---|---|---|
| 2017/0240147 | A1* | 8/2017 | Kotera | ................ B60T 1/067 |
| 2017/0240148 | A1* | 8/2017 | Kotera | ................ B60T 8/17 |
| 2019/0168724 | A1* | 6/2019 | VandenBerg, III | ..... B60T 8/171 |
| 2020/0108809 | A1* | 4/2020 | Mizutani | ............... B60T 17/221 |

FOREIGN PATENT DOCUMENTS

| | | |
|---|---|---|
| KR | 10-2010-0032244 | 3/2010 |
| KR | 10-2012-0047691 | 5/2012 |
| KR | 10-2013-0055771 | 5/2013 |
| KR | 10-1491346 | 2/2015 |
| KR | 10-2015-0049728 | 5/2015 |
| KR | 10-2020-0081477 | 7/2020 |

OTHER PUBLICATIONS

Korean Intellectual Property Office Application No. 10-2022-7040960, Office Action dated Nov. 18, 2024, 5 pages.

* cited by examiner

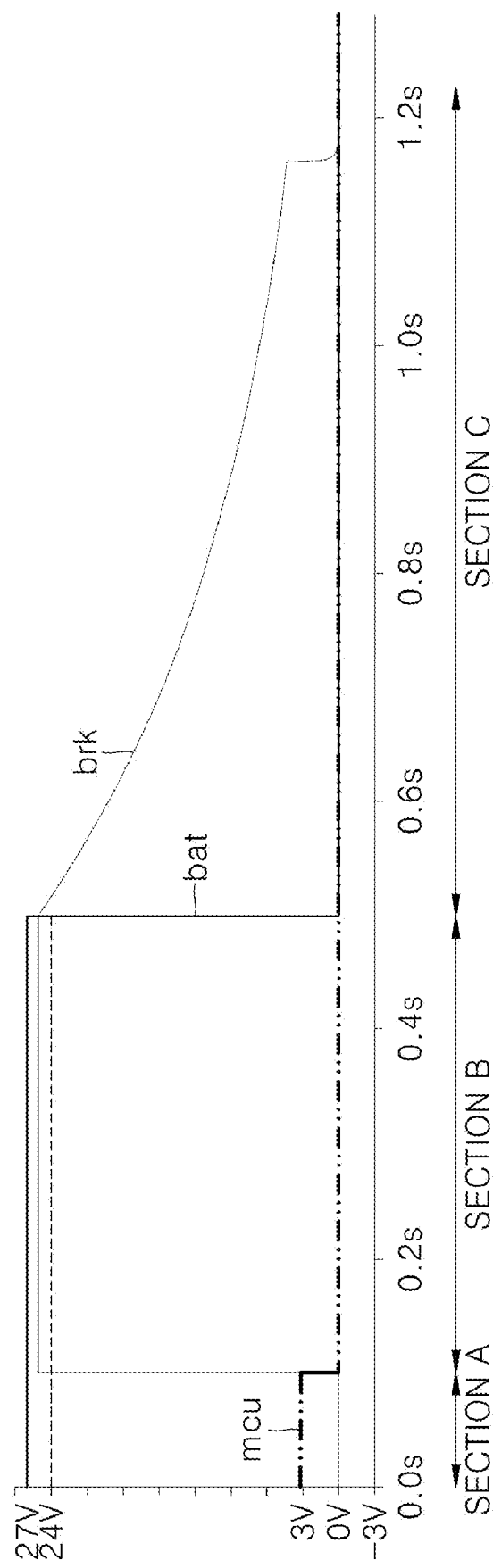

DEVICE OF BRAKE CONTROLLING AND ROBOT INCLUDING THEREOF

CROSS-REFERENCE TO RELATED PATENT APPLICATIONS

This application is the National Stage filing under 35 U.S.C. 371 of International Application No. PCT/KR2020/012642, filed Sep. 18, 2020, which claims the benefit of earlier filing date and right of priority to Korean Application No. 10-2020-0085662, filed Jul. 10, 2020, the contents of which are all incorporated by reference herein in their entirety.

TECHNICAL FIELD

The present invention relates to a technology regarding a brake control device and a robot including the same.

BACKGROUND ART

In large spaces such as hypermarkets, department stores, airports, and golf courses in which human and material exchanges occur actively, various people carry various articles and move. In this case, in order to provide user convenience, robots such as carts may assist a user in moving articles.

In addition, robots may assist a user in a distribution center or a container center or may automatically perform a logistics delivery operation without user control.

Conventionally, a user directly or indirectly handles and moves a robot. Recently, various technologies have been proposed such that a robot, which performs logistics delivery, follows a user, or performs a certain task, autonomously operates.

Meanwhile, when power is unexpectedly cut off while a robot is moving, the robot may suddenly stop, which may cause the robot to overturn or may cause damage to articles being transported. Thus, there is a need for a method of solving such a problem.

Therefore, in this specification, a method of controlling a brake of a robot will be described.

DISCLOSURE

Technical Problem

The present invention is directed to providing a method of preventing a robot from overturning due to a sudden stop when a brake operates due to an abnormality in power while the robot is moving.

The present invention is also directed to providing a method in which a robot performs an emergency stop or a slow stop according to a situation around the robot in a situation in which the robot should suddenly stop due to an abnormality in power supply.

The present invention is also directed to providing a method of increasing safety in moving and traveling of a robot by extending a sudden braking time of a brake due to a power supply problem.

Objects of the present invention are not limited to the above-described objects and other objects and advantages of the present invention which are not described can be appreciated from the following descriptions and will be more clearly understood from embodiments of the present invention. Further, it will be easily appreciated that the objects and advantages of the present invention can be practiced by means recited in the appended claims and a combination thereof.

Technical Solution

According to one embodiment of the present invention, a robot includes a normal power supply configured to supply electrical energy required for moving and operating the robot, a brake module configured to brake a motor configured to move the robot or release braking of the motor, an emergency power supply configured to receive the electrical energy from the normal power supply to be charged and supply the charged electrical energy to the brake module when supply of the electrical energy from the normal power supply is stopped, and a control processor configured to apply a signal for controlling the supply of the electrical energy to the brake module and control movement and operation of the robot.

According to one embodiment of the present invention, a brake control device includes a battery, a capacitor charged by the battery, and a brake module configured to receive electrical energy from the battery or the capacitor to brake a motor or release braking of the motor.

Advantageous Effects

When embodiments of the present invention are applied, a robot can be prevented from overturning due to a sudden stop when a brake operates due to an abnormality in power while the robot is moving.

When embodiments of the present invention are applied, a robot can perform an emergency stop or a slow stop according to a situation around the robot in a situation in which the robot should suddenly stop due to an abnormality in power supply.

When embodiments of the present invention are applied, safety in moving and traveling of a robot can be increased by extending a sudden braking time of a brake due to a power supply problem.

The effect of the present invention is not limited to the effect described above, and those skilled in the art of the present invention can easily derive various effects of the present invention in a constitution of the present invention.

DESCRIPTION OF DRAWINGS

FIG. 14 is a diagram illustrating a process in which a brake emergency power supply operates according to one embodiment of the present invention.

MODES OF THE INVENTION

Figure 1:
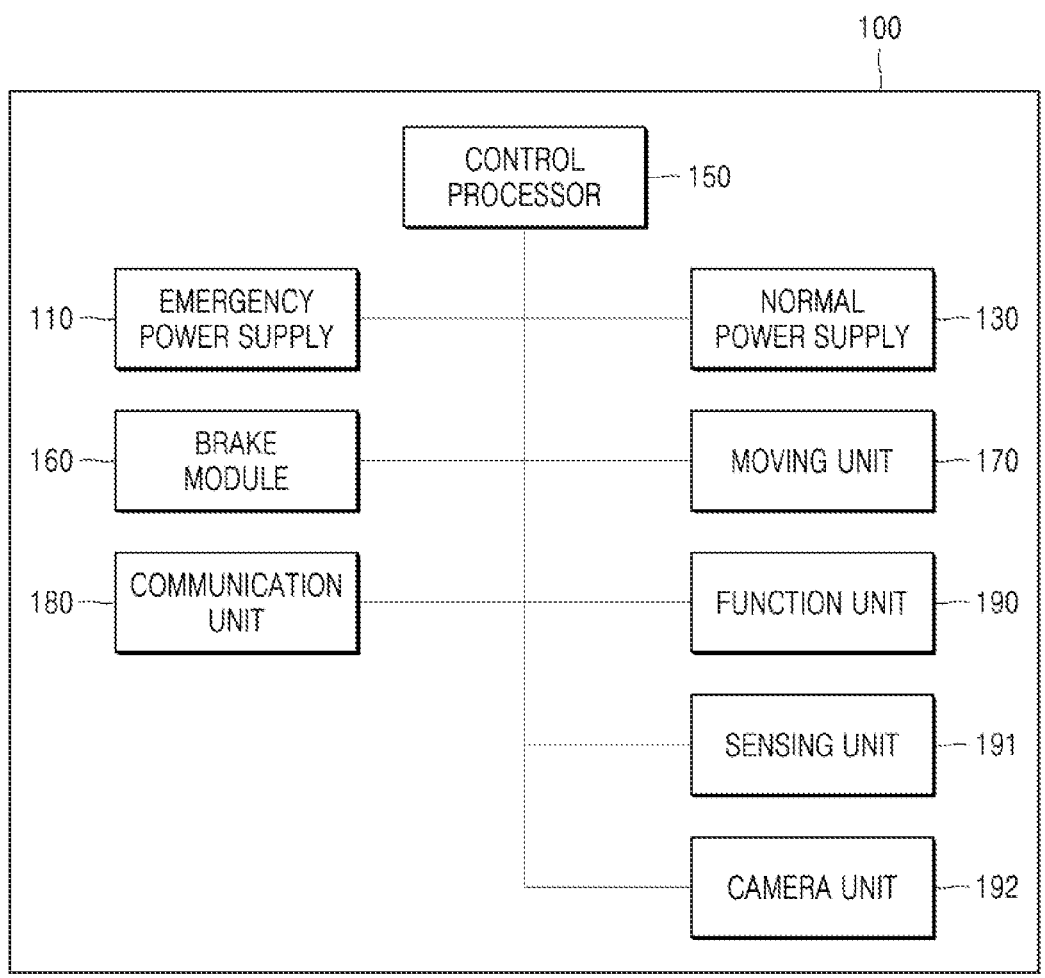
FIG. 1 is a diagram illustrating components of a robot according to one embodiment of the present invention.

Hereinafter, embodiments of the present invention will be described in detail with reference to the accompanying drawings so that those skilled in the art may easily practice the present invention. The present invention may be embodied in various different forms and is not limited to the embodiments to be described hereafter.

A part irrelevant to the description will be omitted to clearly describe the present invention, and the same or similar components will be designated by the same reference numerals throughout the specification. In addition, some embodiments of the present invention are described in detail with reference to the exemplary drawings. In the following description, the same components will be designated by the same reference numerals although they are shown in different drawings. Further, in the description of the present invention, a detailed description of known functions and configurations incorporated herein will be omitted when it may make the subject matter of the present disclosure rather unclear.

In addition, terms such as first, second, A, B, (a), and (b) may be used herein when describing components of the present invention. These terms are solely for the purpose of differentiating one component from the other but not to imply or suggest the substances, order or sequence of the components. It should be noted that, when it is described that a component is "connected," "coupled," or "joined" to another component, the component may be directly connected, coupled, or joined to another component, but still another component may be "connected," "coupled," or "joined" between the components, or the components may be "connected," "coupled," or "joined" through still another component.

Further, in implementing the present invention, for convenience of description, components may be described by being subdivided. However, these components may be implemented in a device or a module, or a single component may be implemented by being divided into a plurality of devices or modules.

Hereinafter, in the present specification, a robot may perform the following tasks for a specific purpose. In one embodiment, a robot may perform tasks of delivering goods and picking goods up. Alternatively, a robot may perform tasks such as security, monitoring, guiding, and cleaning tasks.

Also, in the present specification, in addition to such functions, a robot may provide a specific function according to the characteristics of a space in which the robot is disposed. In the present specification, a robot includes a mobile robot, and as a movement type of the robot, various types such as wheel, caterpillar, biped walking, and triped walking types may be applied.

Therefore, in the present specification, when a robot is a mobile robot, the mobile robot collectively refers to a device which includes a moving unit that is movable using certain information and a sensor and provides certain functions.

In addition, in the present specification, descriptions will be provided based on a robot to which a brake control device is coupled to control a brake coupled to a moving unit of the robot. The brake control device is a device which is coupled to the brake of the robot to supply emergency power to the brake.

Hereinafter, in one embodiment, a brake control device is coupled to a robot. Alternatively, in one embodiment, the brake control device is a component device included in the robot. In addition, the robot may be an autonomous mobile device, and the brake control device may be detachably coupled to the robot or integrally coupled to the robot.

FIG. 1 is a diagram illustrating components of a robot according to one embodiment of the present invention. The components may include key components for moving the robot, and various components may be additionally combined according to a main function or movement type of the robot.

A control processor 150 which controls the movement and stop of a robot 100 may include software or hardware. The control processor 150 may control other components of the robot 100 or check a state of each of the components.

A normal power supply 130 supplies electrical energy required for moving and operating the robot. The normal power supply 130 includes an electric charge storage component such as a battery. In addition, the normal power supply 130 may further include a component such as a direct current (DC)/DC converter to supply electricity to a motor.

A moving unit 170 includes various parts for moving the robot. In one embodiment, the moving unit 170 includes wheels, caterpillars, and legs of a biped/quadruped walking robot. The moving unit 170 moves the robot according to the operation of the motor.

A brake module 160 brakes the motor for moving the robot or releases braking of the motor. The brake module 160 may include a brake and components necessary for controlling the brake.

An emergency power supply 110 receives electrical energy from the normal power supply 130 to be charged with the received electrical energy, and when the supply of electrical energy from the normal power supply 130 is stopped, the emergency power supply 110 supplies the charged electrical energy to the brake module 160.

The control processor 150 applies a signal for controlling the supply of electrical energy to the brake module 160 and controls movement and operation of the robot. In addition, the control processor 150 may control other components of the robot such as a communication unit 180, a function unit 190, a sensing unit 191, a camera unit 192, and the like.

The function unit 190 provides a function necessary for the robot to perform a specific function such as a cleaning, security, or delivery function. In the case of a cleaning robot, a cleaning brush is one embodiment of the function unit 190. In the case of a delivery robot, a delivery holder, a robot arm for lifting and lowering goods, or the like is one embodiment of the function unit 190.

The sensing unit 191 may detect surrounding obstacles or measure a weight of goods delivered by the robot. The camera unit 192 photographs a periphery of the robot. The sensing unit 191 and the camera unit 192 may generate data about a current state of the robot or a surrounding situation.

In particular, the sensing unit 191 and the camera unit 192 may check a state of a road surface (a slippery road surface, a road surface with a high frictional force, or the like) in a space in which the robot 100 is currently moving, a state in which an obstacle such as a wall or glass is disposed, a state in which the robot goes up and down a stair or a ramp, a state in which the robot delivers heavy goods, or the like and may provide information for determining whether to transmit power from the emergency power supply 110 to the brake module 160 in an emergency.

FIG. 1 illustrates a configuration of a brake emergency power application system, that is, a brake control device, and it is possible to prevent overturning of a mobile robot and a secondary accident that may occur due to a battery failure or malfunction.

When electrical energy is supplied, that is, when power is applied, the brake allows rotation of components such as wheels of the moving unit 170. When power is cut off, the brake immediately stops rotational movement of a motor. That is, when power is cut off, the brake operates and stops rotation of the wheel or the like, and when power is applied, the brake becomes an opened state.

That is, the brake stops movement of the robot by braking a motor of the moving unit 170 or releases braking of the motor, and in this case, the robot may move according to power of the motor.

Under a normal operating condition, the brake operates in a state in which a speed of the motor decreases, and thus there is no risk of the robot overturning. However, when power applied to the brake is cut off due to an abnormal operation of a battery of the mobile robot or a disconnection of a connection contact, the brake may be locked at an unexpected time point. In this case, there is a risk of the robot overturning due to inertia caused by an instantaneous movement speed.

When the configuration of FIG. 1 is applied to prevent the risk, the brake may be unlocked until a speed of the robot decreases. That is, even when an abnormality occurs in the normal power supply 130, the emergency power supply 110 temporarily supplies power to the brake module 160 to maintain an opened state of the brake for a short time. Then, when power of the emergency power supply 110 is discharged, the brake operates.

For a more precise operation, at a time point at which the battery fails, when the robot is positioned on a ramp, a stair, or a glass wall, the control processor 150 may control the brake to be locked in a short time. To this end, when the battery fails, an operation state of the brake can be determined using surrounding situation data possessed by the robot that is a moving object.

Figure 2:
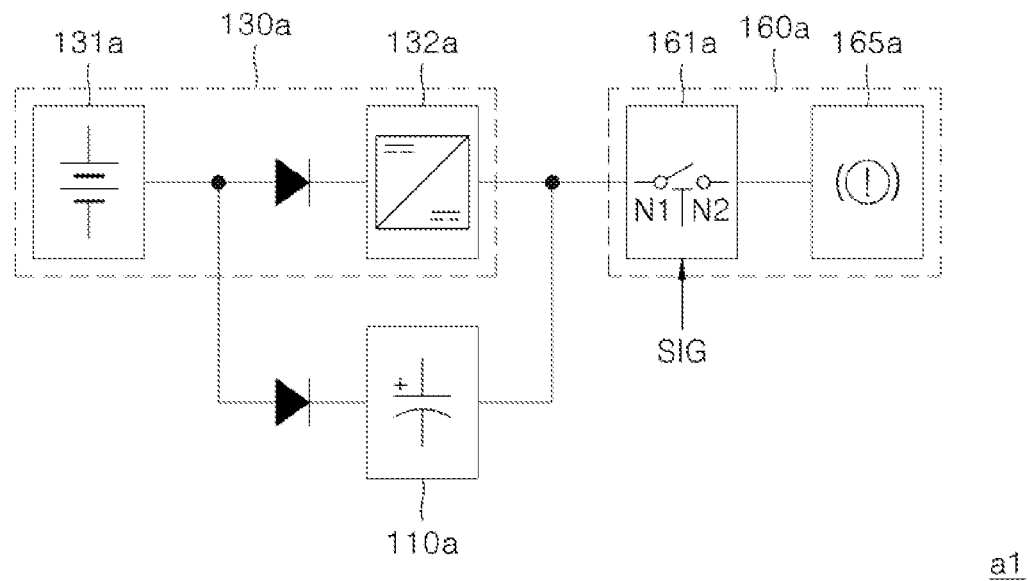
FIG. 2 illustrates a configuration and an operation process in which power is temporarily supplied to a brake of a robot when the brake is closed due to a power supply problem according to one embodiment of the present invention.
Figure 2:
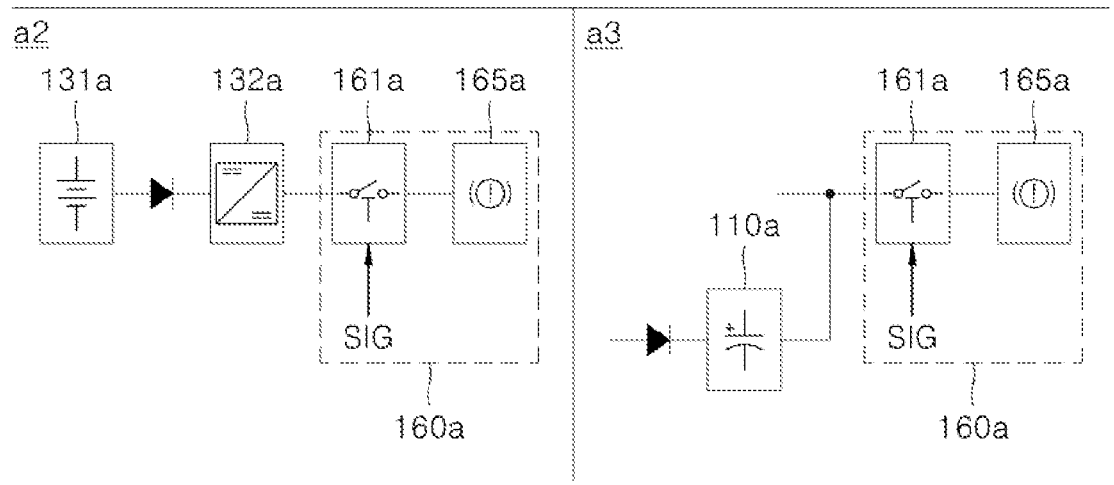

FIG. 2 illustrates a configuration and an operation process in which power is temporarily supplied to a brake of a robot when the brake is closed due to a power supply problem according to one embodiment of the present invention. First, descriptions will be provided with reference to a1 of FIG. 2.

normal power supply 130a includes a battery 131a and a DC/DC converter 132a. In one embodiment, one embodiment of an emergency power supply 110a is a capacitor which provides emergency power. The capacitor is charged by the battery 131a of the normal power supply 130a. A brake module 160a includes a switch 161a and a brake 165a.

In the switch 161a, a wire to which the DC/DC converter and the emergency power supply are coupled is connected to a first terminal N1, and a wire coupled to the brake is connected to a second terminal N2. The switch 161a may be turned on or off according to a control signal of a control processor 150 to electrically connect or disconnect the first terminal N1 and the second terminal N2.

In a situation in which an abnormality does not occur in power supply in a normal time, power is transmitted from the battery 131a to the DC/DC converter 132a. The switch 161a receives a signal SIG from the control processor 150 and thus is turned on or off.

When the control processor 150 applies an on signal to the switch to drive a robot, the brake 165a receives power, and the brake of the robot maintains an opened state. As a result, the robot does not stop.

On the other hand, when the control processor 150 applies an off signal to the switch 161a to stop the robot, power applied to the brake 165a is cut off, and thus the brake of the robot operates, thereby stopping the robot.

In a normal time, when an abnormality does not occur in power supply (see a2), the emergency power supply 110a does not separately participate in operating the brake module 160a. In addition, the control processor 150 of which one embodiment is a micro control unit (MCU) or a main control unit (MCU) may apply a signal to the switch 161a to control the brake 165a.

On the other hand, when an abnormality occurs in the normal power supply 130a, that is, when the normal power supply 130a suddenly fails to supply power, power (for example, Cap voltage) charged in the emergency power supply 110a is supplied to the brake module 160a (see a3). That is, a voltage of the emergency power supply 110a, for example, the voltage of capacitor (capacitor voltage), is applied to the switch 161a of the brake module 160a. That is, the signal SIG for turning the switch 161a on is supplied from the emergency power supply 110a.

Therefore, as shown in a3, even when power of the normal power supply 130a is suddenly cut off, the switch 161a maintains a state of being turned on for a certain time with power charged in the emergency power supply 110a, for the corresponding time, the brake 165a receives power from the emergency power supply 110a, and the brake of the robot maintains an opened state.

As a result, the robot does not suddenly stop. When power charged in the emergency power supply 110a is discharged, power is no longer supplied to the switch 161a of the brake module 160a. Thus, the switch 161a is turned off, and power applied to the brake 165a is cut off so that the brake of the robot operates thus stopping the robot.

Accordingly, when power of the normal power supply 130a is suddenly cut off, and thus the robot suddenly stops, the robot may overturn due to a speed at which the robot has previously moved. Therefore, when power of the normal power supply 130a is suddenly cut off, the emergency power supply 110a temporarily maintains an opened state of the brake 165a with power charged in the emergency power supply 110a, thereby preventing a sudden stop of the robot and gradually stopping the robot.

This is summarized as follows. When power of the normal power supply 130a is in a normal state, a signal such as the signal SIG applied from the control processor 150 is applied to the switch 161a. However, when a problem occurs in the normal power supply 130a, a voltage of the emergency power supply 110a serves as a signal such as the signal SIG to be applied to the switch 161a.

Exemplarily, power transmission of the normal power supply 130a and the emergency power supply 110a may be implemented through an OR gate using a diode. The emergency power supply 110a may be implemented in various ways, and when a capacitor is used, a capacitor having a capacitance of several thousand uF may be applied. Of course, this may be variable according to a weight of the robot or an amount of electrical energy required for brake control.

In a structure of FIG. 2, even when the normal power supply 130a fails, since the emergency power supply 110a serving as a standby power supply maintains a certain level of voltage for a certain time, power is supplied to the brake, and during the certain time, the brake maintains an opened state.

As shown in FIG. 2, in a normal time, certain power is supplied to the brake through the DC/DC converter 132a, and when the normal power supply 130a does not operate properly due to detachment of the battery, an abnormal state, or the like, power supplied to the DC/DC converter 132a disappears, but power stored in the capacitor serving as a standby power supply is applied to the brake, and the brake maintains an opened state for a certain time.

Figure 3:
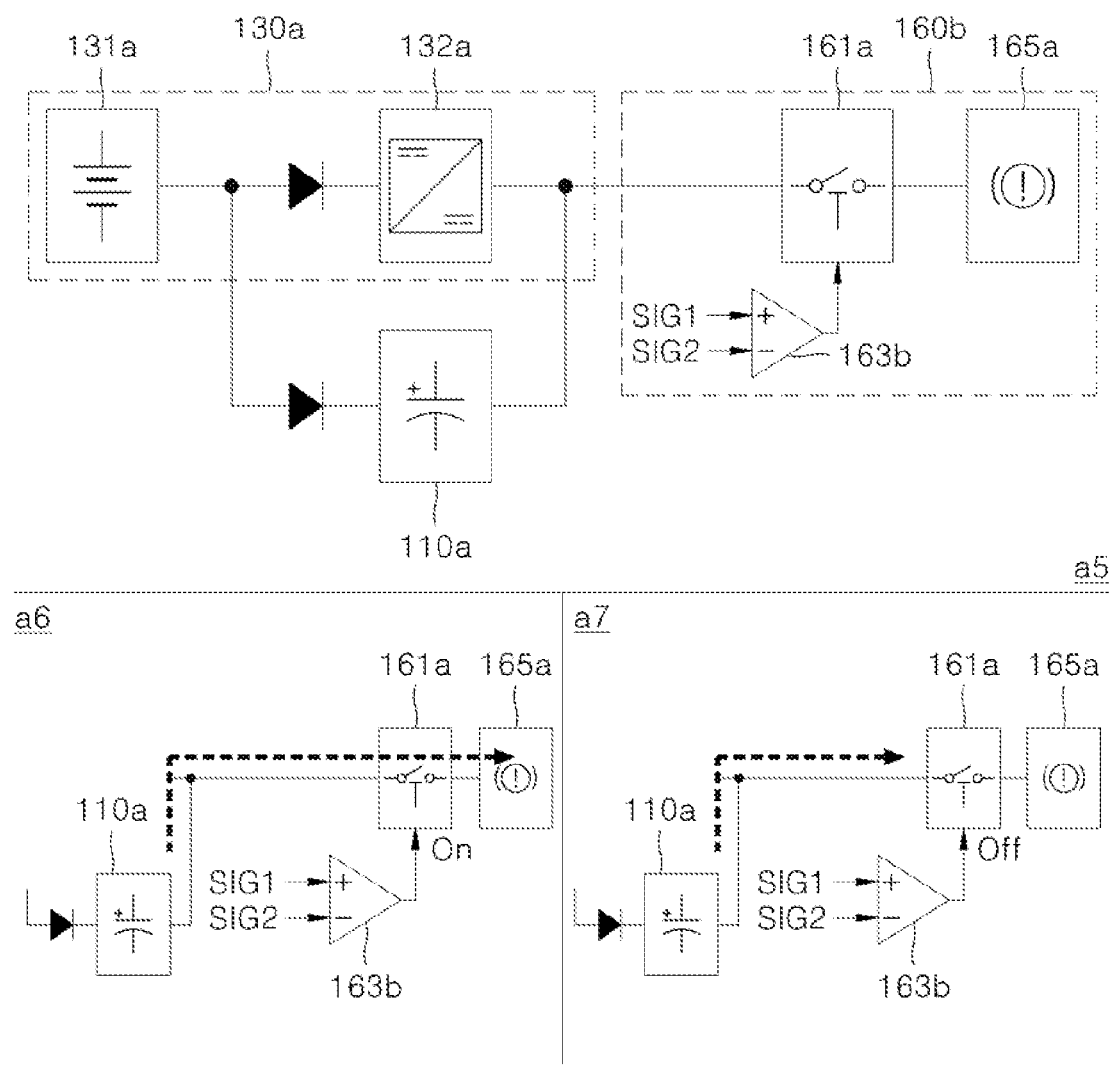
FIG. 3 illustrates a configuration and an operation process in which power is temporarily supplied to a brake of a robot when the brake is closed due to a power supply problem according to another embodiment of the present invention.

FIG. 3 illustrates a configuration and an operation process in which power is temporarily supplied to a brake of a robot when the brake is closed due to a power supply problem according to another embodiment of the present invention. Unlike that shown in FIG. 2, an embodiment in which the robot operates differently according to an inclined state of a place in which the robot is positioned is provided.

When a5 of FIG. 3 is compared with a1 of FIG. 2, a brake module 160b additionally includes an operational amplifier 163b. The operational amplifier 163b receiving a signal SIG1 and a signal SIG2 applies an output signal to a switch 161a. The switch 161a of the brake module 160b may be turned on or off according to the signal SIG1 and the signal SIG2.

The signal SIG1 is a signal applied from a control processor 150 and an emergency power supply 110a. The signal SIG2 is a signal for which a motor input voltage is applied, wherein the motor input voltage is a voltage generated from a counter electromotive force generated by a motor of a moving unit 170 of the robot, for example, a motor that rotates a wheel. When the voltage generated by the motor, that is, the counter electromotive force is greater than a reference, brake power supplied from the emergency power supply 110a is cut off to immediately stop the robot.

A case of a normal state in a normal time is described above in a1 and a2 of FIG. 2, and thus a case in which an abnormality occurs in the normal power supply 130a will be described. This is shown in a6 and a7 of FIG. 3.

In an abnormal state of power, the normal power supply 130a does not operate, and a voltage (capacitor voltage) applied from the emergency power supply 110a is applied as the signal SIG1. Meanwhile, a voltage by a counter electromotive force generated by the motor is applied as the signal SIG2.

When the normal power supply 130a does not operate on a flat ground surface, the voltage (Cap voltage) applied from the emergency power supply 110a is applied as the signal SIG1 as shown in a6. Meanwhile, a voltage by a counter electromotive force of the motor is applied as the signal SIG2, but since the robot is disposed on the flat ground surface, a counter electromotive force is not generated. As a result, the switch 161a is turned on to temporarily maintain an opened state of a brake 165a using power charged in the emergency power supply 110a, thereby preventing a sudden stop of the robot and gradually stopping the robot.

One the other hand, when the normal power supply 130a does not operate on a ramp, the voltage (Cap voltage) applied from the emergency power supply 110a is applied as the signal SIG1 as shown in a7. Meanwhile, a voltage by a counter electromotive force of the motor is applied as the signal SIG2, and since the robot is disposed on the ramp, a counter electromotive force is generated. As a result, since the switch 161a is turned off to prevent power charged in the emergency power supply 110a from passing through the switch, the robot stops according to the operation of the brake 165a.

The operational amplifier 163b of FIG. 3 compares a counter electromotive force of the motor with a reference value preset according to an angle of the ramp, a weight of the robot, or the like, and when the counter electromotive force of the motor is greater than the reference value, the operational amplifier 163b may provide a voltage by the counter electromotive force voltage of the motor to the switch 161a as an off signal.

Regarding the above-described embodiments, in order to prevent the robot from overturning due to a sudden stop when the robot stops in an abnormal position due to a failure or malfunction of the battery in the robot, power charged in a storage battery of the emergency power supply 130 is used to provide brake opening power, in order to maintain a natural deceleration time of a speed of the motor.

In addition, by using a magnitude of a counter electromotive force of the motor that moves the robot, the brake can be temporarily opened (on a flat ground surface or when a gradient is not large), or the brake can be immediately applied (on a ramp with a large gradient).

FIG. 3 illustrates an embodiment in which the brake is immediately applied on a ramp using a counter electromotive force of the motor. In addition, when the robot approaches a stair or is placed around an object such as a glass wall that has a possibility of being damaged, a camera or the like may detect the stair or the object to adjust the operation of the brake. That is, when an abnormality occurs in a normal power supply 130 in a space in which a robot 100 needs to immediately stop, power from an emergency power supply 110 is blocked from being applied to a brake module 160, thereby preventing overturning or damage.

The switch 161a of FIG. 3 may be turned on or off according to a signal generated from environment information of the robot confirmed at a time point at which the supply of electrical energy from the normal power supply is stopped. For example, by using a counter electromotive force of the motor, according to environmental information for providing a notification of a ramp or environmental information for providing a notification of a situation in which the robot should immediately stop, the switch 161a may be controlled to be turned on or off, thereby operating the brake 165a.

A configuration in which a signal is applied to the switch exemplarily described with reference to FIGS. 2 and 3 will be described in more detail.

Figure 4:
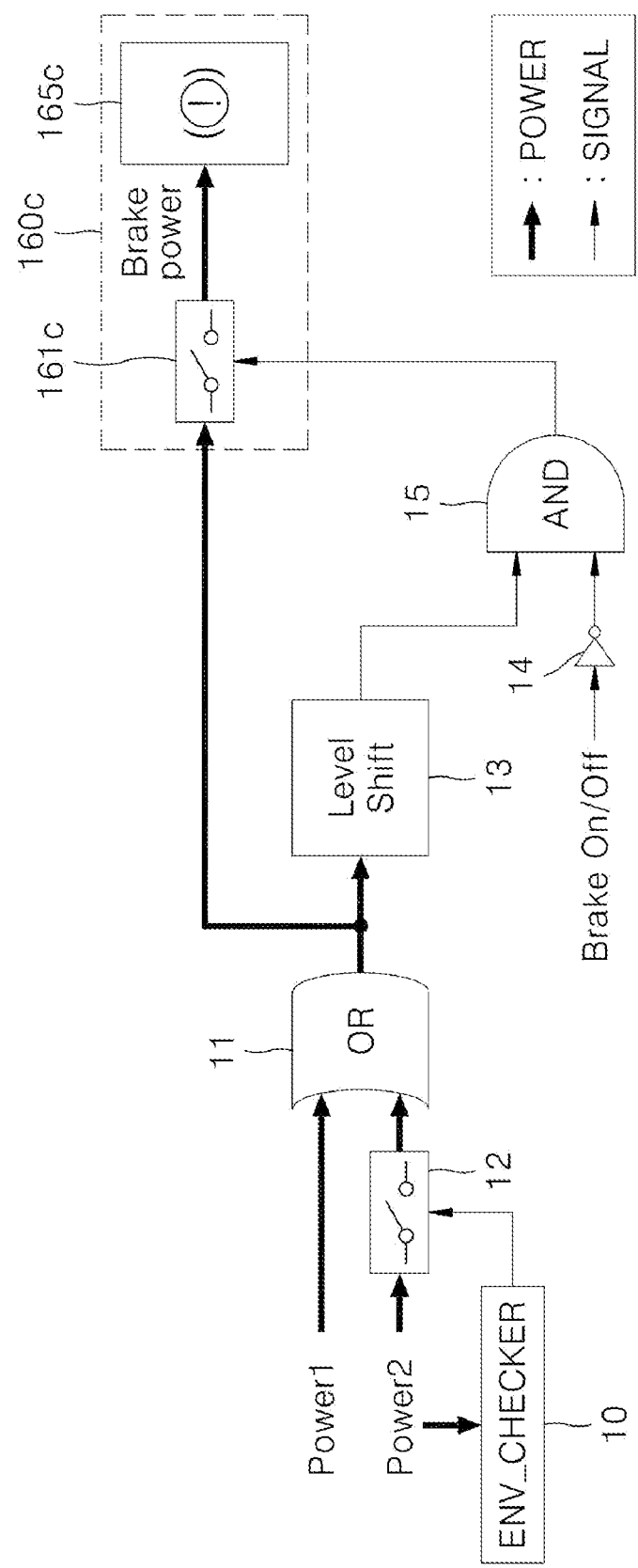
FIG. 4 is a diagram illustrating a detailed configuration according to one embodiment of the present invention.

FIG. 4 is a diagram illustrating a detailed configuration according to one embodiment of the present invention. As described above, the configuration is a configuration for preventing a robot from overturning due to a brake being suddenly locked due to an error in power application.

In addition, the configuration is a configuration in which, even when an error in power application occurs, when the robot needs to stop, a surrounding situation of the robot is monitored to control the brake to be locked. To this end, FIG. 4 illustrates a configuration further including an environment determiner 10 for controlling the supply of electrical energy from an emergency power supply to a brake module 160c.

For example, at a time point at which the supply of electrical energy from a normal power supply 130, for example, a battery, is stopped or fails, when the robot is positioned on a ramp, a stair, or a glass wall, it is more advantageous to lock the brake in a short time. Therefore, when the battery fails, an operation state of the brake is determined using surrounding situation data possessed by the robot.

A block diagram of a brake emergency power application system exemplarily shown in FIG. 4 will be described in detail.

A configuration of FIG. 4 in which a process of supplying power is indicated by a thick solid line will be described. Power applied to a brake 165c, that is, "brake power", is supplied by "Power1" which is a main power supplied from a normal power supply 130 of which one embodiment is a main battery and "Power2" supplied from an emergency power supply 110 of which one embodiment is a standby power supply (capacitor). When one of Power1 and Power2 is high, an OR gate 11 outputting a high signal is disposed.

In one embodiment, Power2 that is the standby power is supplied from the capacitor which is charged by a battery. Power2 that is the standby power is also supplied to an environment determiner (ENV_CHECKER) 10 which drives the brake and checks a state of a surrounding environment. Even when the supply of Power1 that is the main power source is impossible, the environment determiner 10 may operate.

The environment determiner (ENV_CHECKER) 10 determines whether a space in which a robot travels is on a ramp, determines a condition of a road surface in a space in which the robot travels, or determines whether a space in which the robot travels is near a wall or a stair.

In order to determine whether the space is on the ramp, as described above, the environment determiner 10 may monitor a counter electromotive force generated by a motor of a moving unit 170. That is, the environment determiner 10 stores a magnitude of the counter electromotive force of the motor constituting the moving unit 170.

When the magnitude of the back electromotive force is greater than or equal to a set reference, a switch 12 disposed between a brake module 160c and the emergency power supply is blocked. In one embodiment, being blocked means that the switch 12 is turned off to prevent electrical energy of Power2 from being input to the OR gate 11.

In addition, the switch 12 is disposed between the brake module 160c and the emergency power supply, such that components for enabling electrical connection is provided. As shown in FIG. 4, the switch 12 may be electrically connected to components 11 and 161c involved in supplying electrical energy to the brake module 160c.

In order to check a condition of a road surface, the environment determiner 10 may use information provided by a camera unit 192. One embodiment of the camera unit 192 is a two dimensional (2D) camera or a three dimensional (3D) camera.

In addition, in order to check a state of a road surface, the environment determiner 10 may use information provided by a sensing unit 191 which detects the road surface in a space in which the robot travels. One embodiment of the sensing unit 191 is an ultrasonic sensor, an infrared sensor, a light detection and ranging (LIDAR) sensor, a laser sensor, or the like.

That is, environmental information of the robot, which is confirmed at a time point at which the supply of electrical energy of the normal power supply, for example, the battery, is stopped or fails, may be stored in the environment determiner 10, and the switch 12 may be turned on or off according to a signal generated from the information.

A control processor 150 may store information, which is for instructing immediate braking of the robot using data generated by the camera unit 192 or the sensing unit 191, in the environment determiner 10. The information may be stored in the environment determiner 10 whenever the robot moves or whenever an environment changes. In addition, the stored information is stored as a true/false value so that the switch 12 may be immediately turned on or off.

The environment determiner 10 turns on or off the switch 12 disposed between the brake module 160c and the emergency power supply according to the stored information.

For example, by using a counter electromotive force of the motor, according to environmental information for providing a notification of a ramp or environmental information for providing a notification of a situation in which the robot should immediately stop, the switch 12 may be controlled to be turned on or off, thereby operating the brake 165c.

When information for instructing immediate braking is true, the environment determiner 10 may turn the switch 12 off.

In order to identify a wall or a stair, the environment determiner 10 may use information provided by the camera unit 192. In addition, the environment determiner 10 may determine whether a wall or a stair is disposed in the vicinity using map data stored by the control processor 150 to support autonomous driving of the robot.

A thin solid line shows a direction of a signal. That is, according to a normal condition and a battery failure condition, a signal for driving the brake 165c controls the operation of the brake using a level shift 13 for determining whether brake input power is present, an inverter 14 (or a NOT gate), and an AND gate 15 (AND Gate). A brake on/off signal is a signal applied by the control processor 150, and a detailed operation thereof will be described in detail with reference to FIGS. 5 to 7.

Since the environment determiner 10, which is a circuit for determining a state of a surrounding environment, needs to maintain or process information even when the supply of the main power fails, the environment determiner 10 may receive electrical energy from Power2 which is the standby power.

That is, the environment determiner 10 may receive electrical energy from the emergency power supply 110 to operate even when the normal power supply 130 fails. In one embodiment, the environment determiner 10 may include a flip-flop or a capacitor and may be implemented to have information temporarily (for a very short time such as 1 second).

In addition, when the environment determiner 10 determines that the brake should be unlocked, the switch 12 of a standby power supply is turned on to transmit the standby power Power2 to the brake.

When the environment determiner 10 determines that the brake should not be unlocked, the switch 12 of the standby power supply is turned off to prevent the standby power Power2 from being transmitted to the brake.

Power1 may determine turn-on/off of the switch 12, which determines whether to apply Power2, which is the standby power, to the brake 165c. For example, when Power1 is applied, the switch 12 may be unconditionally turned off. In this case, Power2, which is the standby power, is not applied to the brake.

Of course, when Power1 is applied, the environment determiner 10 may turn the switch 12 off. In this case, the environment determiner 10 may check whether Power1 is applied.

FIG. 4 illustrates a configuration in which the brake module 160c brakes the motor or releases braking of the motor by receiving electrical energy from a battery which is one embodiment of the normal power supply or a capacitor which is one example of the emergency power supply.

In addition, the OR gate 11 includes a first terminal receiving electrical energy from the battery and a second terminal selectively receiving electrical energy from the capacitor according to turn-on/off of the switch 12. The OR gate 11 outputs electrical energy applied by the battery or the capacitor according to an OR operation.

Figure 5:
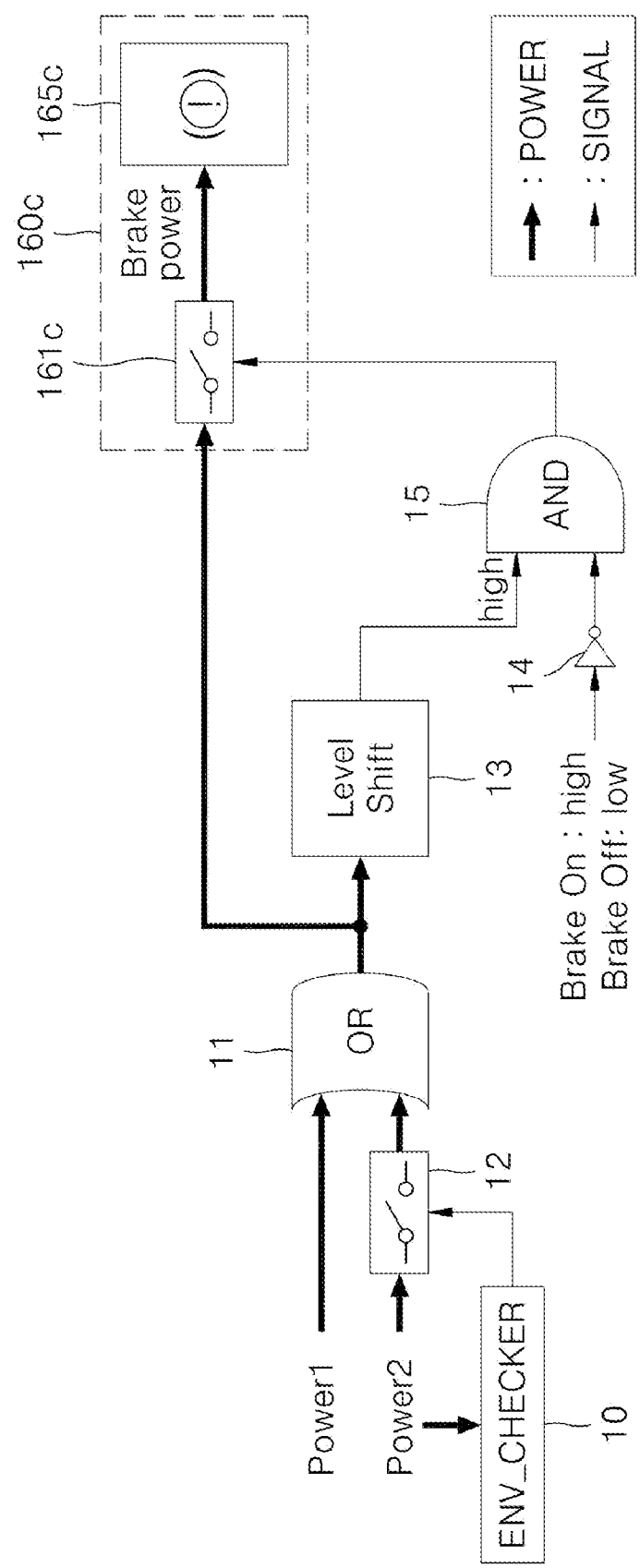
FIG. 5 is a diagram illustrating an operation process of a brake control device according to normal power supply according to one embodiment of the present invention.

FIG. 5 is a diagram illustrating an operation process of a brake control device according to normal power supply according to one embodiment of the present invention. In FIG. 5, it is assumed that a battery normally operates.

That is, main power Power1 applied from a normal power supply 130 is power for operating the brake. In order to determine whether to use Power1, which is the main power, as brake input power, a control processor 150 of which one embodiment is an MCU applies a "brake on/off" signal.

Since a level shift 13 which determines a state of input power always outputs a high signal as the main power is applied, the brake may be locked or unlocked by the "brake on/off" signal applied by the control processor 150. A switch denoted by reference numeral 161c determines whether to apply Power1 to the brake. A brake operation situation by the control processor 150 is summarized in Table 1 below.

TABLE 1

| Control processor (MCU) | Low (brake off) | High (brake on) |
|---|---|---|
| Operation of brake | Unlocking of brake | Locking of brake |

In FIG. 5, when the normal power supply 130 is applied, the level shift 13 outputs a "high" signal, and the "high" signal is input to a first terminal of an AND gate 15.

According to Table 1, when the control processor 150 intends to unlock the brake (brake off), a "low" signal passes through an inverter 14 (or a NOT gate), and a high signal is applied to a second terminal of the AND gate 15. Accordingly, the AND gate 15 outputs a "high" signal to turn the switch 161c on. As a result, Power1 is transmitted to the brake 165c, and the brake 165c becomes an unlocked state.

Meanwhile, according to Table 1, when the control processor 150 intends to lock the brake (brake off), a "high" signal passes through the inverter 14 (or the NOT gate), and a low signal is applied to the second terminal of the AND gate 15. Accordingly, the AND gate 15 outputs a "low" signal to turn the switch 161c off. As a result, Power1 is not transmitted to the brake 165c, and the brake 165c becomes a locked state.

Meanwhile, although Power2 is shown in FIG. 5 as not being transmitted, in the case of another embodiment, Power2 may always be applied in a situation in which Power1 is applied. However, in such a process, an emergency power supply 110 may be charged by the normal power supply 130.

Figure 6:
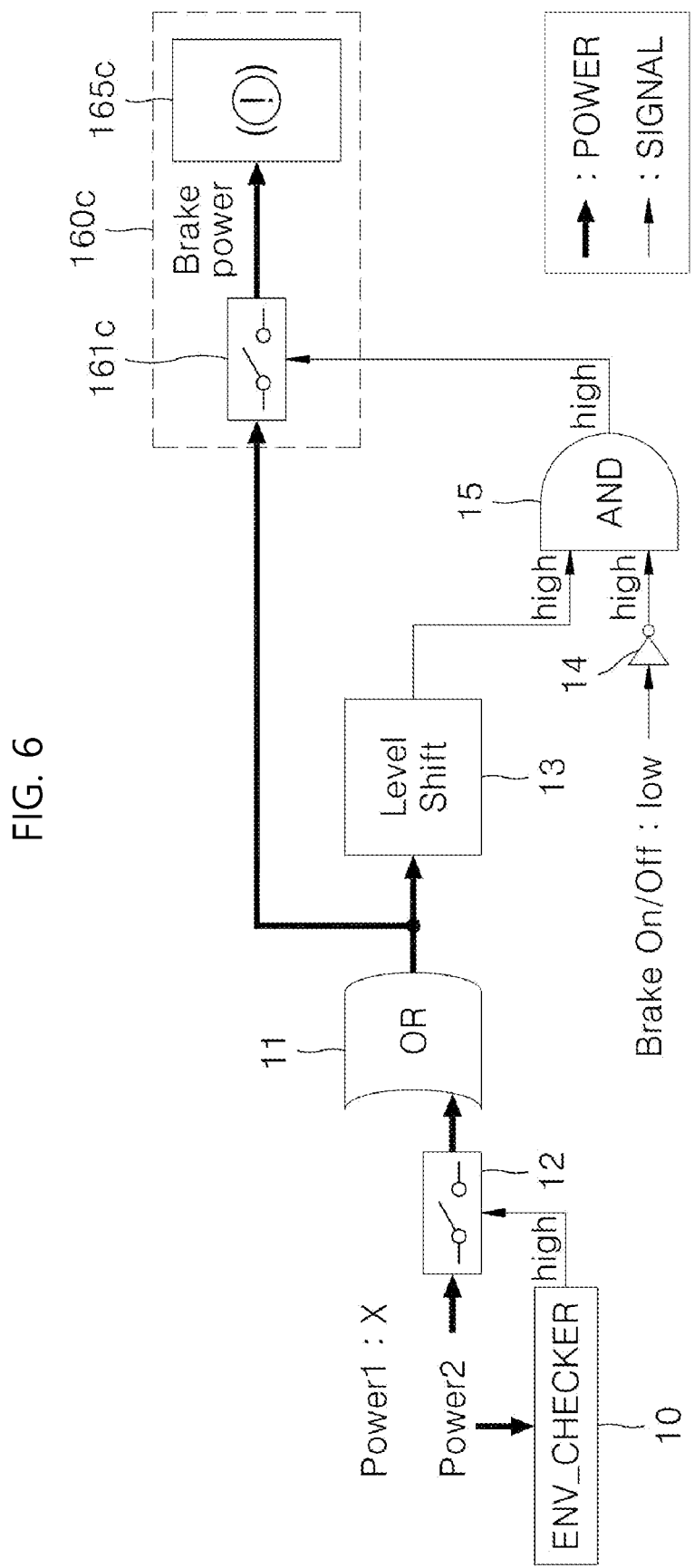
FIG. 6 is a diagram illustrating an operation process of a brake control device in an overturning prevention mode due to a failure of normal power supply according to one embodiment of the present invention.

FIG. 6 is a diagram illustrating an operation process of a brake control device in an overturning prevention mode due to a failure of normal power supply according to one embodiment of the present invention. When a normal power supply 130 fails, a process in which the brake control device operates in the overturning prevention mode is shown.

In order to prevent a robot from overturning, an environment determiner 10 turns a switch 12 on by applying a high signal to the switch 12 such that Power2 may be applied to a brake 165c. The environment determiner 10 applies a high signal to the switch 12 for the overturning prevention mode according to a condition of a road surface, a ramp, a surrounding wall or stair, or whether a fragile object is placed.

As a result, Power2 which is standby power passes through an OR gate 11 to be applied to a level shift 13, and the level shift 13 outputs a high signal.

Meanwhile, normal power for operating a control processor 150 is cut off, and since a brake on/off signal applied from the control processor 150 is determined to be low, an inverter 14 (or a NOT gate) outputs a high signal. As a result, an AND gate 15 outputs a high signal.

A switch 161c which transmits Power2 to the brake 165c is turned on (or closed) by the high signal of the AND gate 15, and Power2 which is power of a standby power supply is transmitted to the brake 165c.

A time for which the brake 165c maintains an opened state is proportional to an amount of power charged in an emergency power supply 110. Therefore, in a process in which a speed of the robot is decreased because power is no longer supplied to a moving unit 170, since the brake 165c maintains a temporarily unlocked state, it is possible to prevent the robot 100 from overturning.

Figure 7:
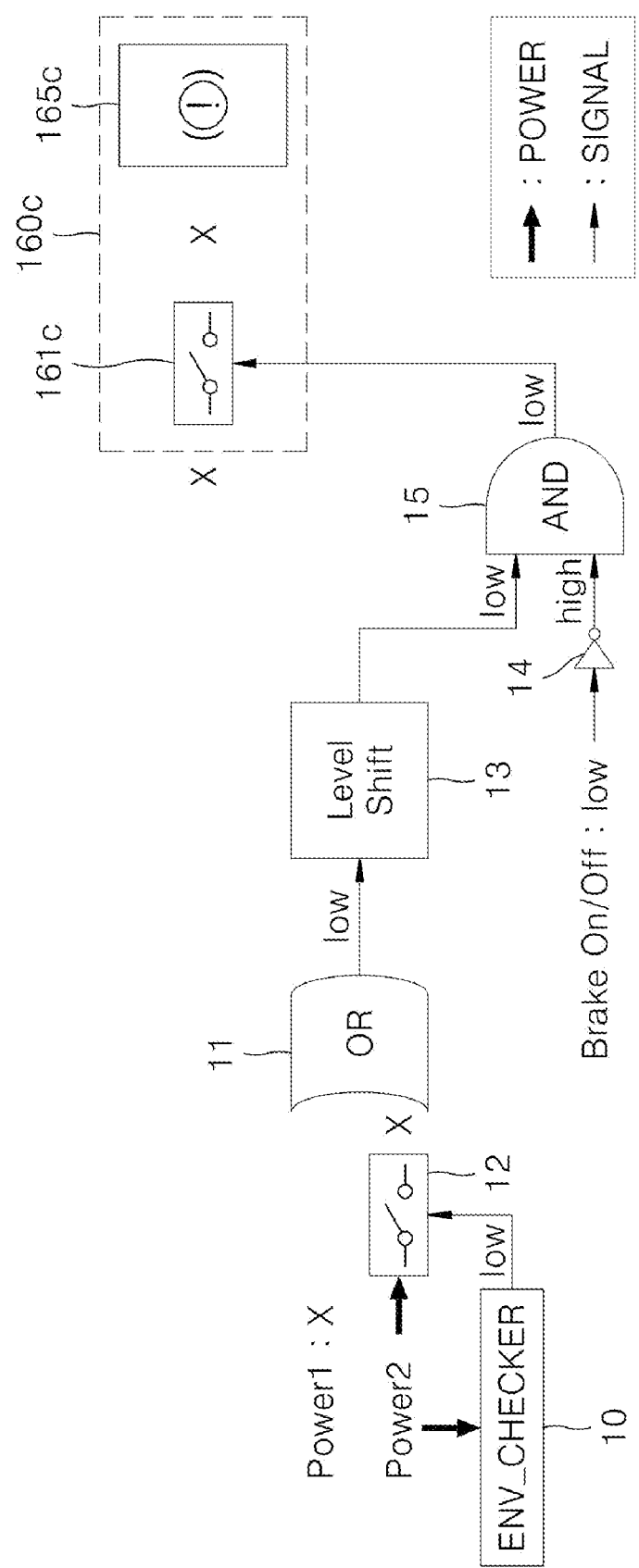
FIG. 7 is a diagram illustrating an operation process of a brake control device in a brake lock mode due to a failure of normal power supply according to one embodiment of the present invention.

FIG. 7 is a diagram illustrating an operation process of a brake control device in a brake lock mode due to a failure of normal power supply according to one embodiment of the present invention.

When a normal power supply 130 fails, a process in which the brake control device operates to immediately lock a brake is shown.

An environment determiner 10, which determines that a robot needs to immediately stops, turns a switch 12 off by applying a low signal to the switch 12 such that Power2 is not applied to a brake 165c. The environment determiner 10 applies a low signal to the switch 12 for an immediate stop mode according to a condition of a road surface, a ramp, a surrounding wall or stair, or whether a fragile object is placed.

As a result, Power2 which is standby power does not passes through an OR gate 11, and a level shift 13 outputs a low signal.

Meanwhile, normal power for operating a control processor 150 is cut off, and since a brake on/off signal applied from the control processor 150 is determined to be low, an inverter 14 (or a NOT gate) outputs a high signal. As a result, an AND gate 15 outputs a low signal. Accordingly, a switch 161c which transmits Power2 to the brake 165c is turned off (or closed) by the low signal of the AND gate 15, and power 2 which is standby power is cut off from the brake 165c. The brake 165c immediately becomes a brake lock state.

The environment determiner 10 can determine how the brake should operate when a battery fails by identifying a position of a ramp, a road surface, a wall, or a stair. Since the environment determiner 10 is operated by Power2 which is the standby power, the environment determiner 10 may temporarily output a signal even when the battery fails. That is, corresponding information may be maintained through a flip-flop or a capacitor.

The summary of FIGS. 4 to 7 is as follows.

An environment determiner 10 outputs a signal generated from environment information of a robot 100 confirmed at a time point at which the supply of electrical energy from a normal power supply 130 is stopped.

A first switch 12 has two terminals. In the first switch 12, a first terminal thereof receives electrical energy of an emergency power supply 110, for example, a capacitor, and electrical energy of the first terminal is output to or cut off at a second terminal thereof according to a signal output from the environment determiner 10.

An OR gate 11 outputs electrical energy output from the normal power supply 130 and electrical energy output from the second terminal of the first switch 12 according to an OR operation. Here, the first switch 12 selectively transmits electrical energy of the capacitor to a second terminal of the OR gate according to a signal output from the environment determiner 10.

A level shift 13 receives electrical energy output from the OR gate 11. An AND gate 15 outputs a signal output from the level shift 13 and a signal output from a control processor 150 according to an AND operation. FIGS. 4 to 7 illustrates embodiments in which a signal output from the control processor 150 is input to the AND gate 15 through an inverter 14.

A second switch 161c is turned on and off according to a signal output from the AND gate 15 and transmits electrical energy output from the OR gate 11 to a brake 165c of a brake module 160c.

Figure 8:
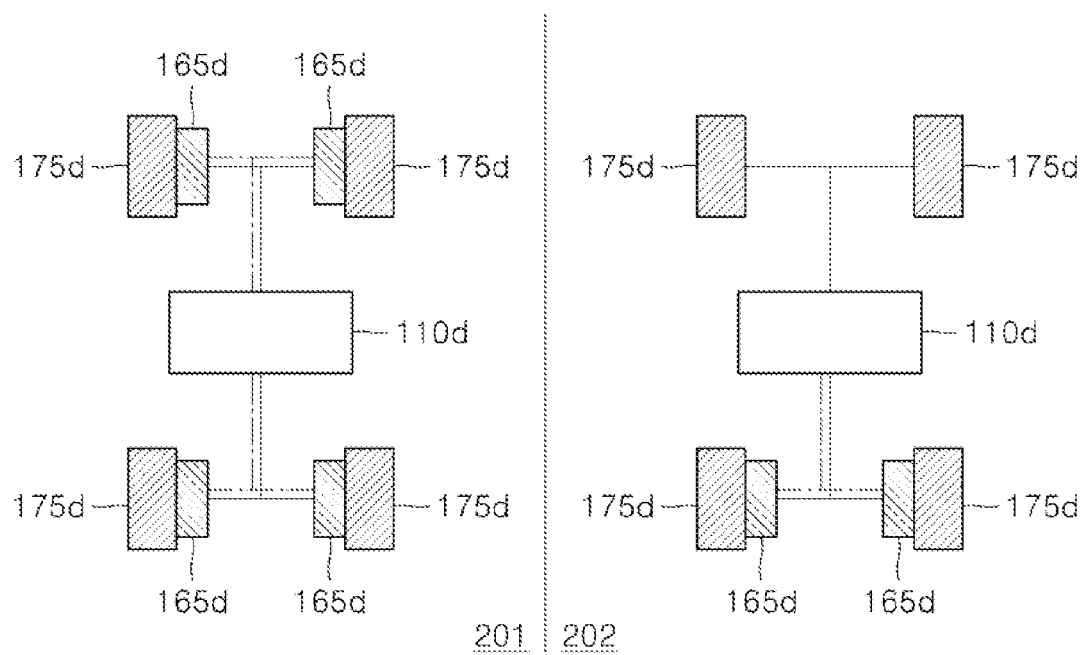
FIG. 8 is a diagram showing a brake application method in a robot according to one embodiment of the present invention.

FIG. 8 is a diagram showing a brake application method in a robot according to one embodiment of the present invention.

A configuration of supplying emergency power to a brake may be applied to all motor-applied robots to which a brake may be attached. Embodiments of the present invention are applicable to various robots and various situations through power connection because a circuit involved in brake power is implemented as an emergency power supply. A four-wheel drive robot of FIG. 8 will be described in detail.

201 in FIG. 8 represents a four-wheel drive type having a configuration in which motors 175d are disposed on all four moving units, and brakes 165d are disposed on all the four moving units.

Meanwhile, 202 represents a four-wheel drive type having a configuration in which motors 175d are disposed on all four moving units, and brakes 165d are disposed on two of the four moving units.

One embodiment of the moving unit is a wheel, a caterpillar, or a leg used in a quadruped/biped walking robot.

An embodiment of 201 relates to a configuration in which an emergency power supply 110d including an emergency power circuit supplies emergency power to four brakes 165d. Therefore, power applied from the emergency power supply 110d is applied to the four brakes 165d. In the configuration as in 201, when a risk of robot overturning is high, emergency power is supplied to the brakes of all four wheels so that the brakes gradually operate in all the four wheels when an abnormality occurs in power. Therefore, in a state in which the supply of power is abnormal, a risk of a robot overturning can be reduced.

When the robot has a possibility of overturning, the configuration of 201 is applied to all wheels to secure a natural deceleration time.

On the other hand, an embodiment of 202 relates to a configuration in which an emergency power supply 110d including an emergency power circuit supplies emergency power to two brakes 165d. Therefore, power applied from the emergency power supply 110d is applied to the two brakes 165d. The embodiment of 202 can be applied to a case in which a moving unit such as a wheel or a leg needs to be placed in place.

In summary, when a robot has a possibility of overturning in a four-wheel mobile robot, emergency power is supplied to all wheels as in 201 to secure a natural deceleration time of the robot to induce the robot to slowly stop.

Meanwhile, even if a robot has no possibility of overturning, in a case of a quadruped robot on a ramp, when a battery is detached, and legs float in the air, in order to secure a time for the legs to reach a ground surface, a corresponding circuit of 202 may be applied to a moving unit that has a possibility of floating in the air.

Meanwhile, when a robot has no possibility of overturning and there is a possibility that all moving units of a quadruped robot may float in the air irrespective of order, a configuration is possible as in 201.

In addition, when braking is performed on each wheel in a four-wheel/two-wheel drive or the like, emergency power may be supplied to each brake. In this case, switching of the emergency power supplied to each brake may vary according to a state of a wheel of the four-wheel/two-wheel drive which is handled by each brake.

When embodiments of the present invention are applied, in order to prevent a robot from overturning due to a brake being closed due to a malfunction of a main power supply (battery), emergency power is temporarily supplied to open the brake, thereby securing a time for a speed of the robot to naturally decrease. When it is safer to quickly close a brake according to a state of a gradient of a ground surface, whether to operate the brake id determined based on a counter electromotive force value of a motor, thereby controlling whether to supply emergency power.

Also, according to one embodiment, a brake module may brake each of motors for rotating four wheels of a robot or may release braking thereof. This means that each brake module is provided and operated for each wheel.

More specifically, assuming a four-wheel drive, braking of a first wheel among four wheels is controlled by a first brake module, and the first brake module is electrically connected to a first emergency power supply. Braking of a second wheel among the four wheels is controlled by a second brake module, and the second brake module is electrically connected to a second emergency power supply. Braking of a third wheel among the four wheels is controlled by a third brake module, and the third brake module is electrically connected to a third emergency power supply. Braking of a fourth wheel among the four wheels is controlled by a fourth brake module, and the fourth brake module is electrically connected to a fourth emergency power supply.

Supplying electrical energy to the first to fourth brake modules by the first to fourth emergency power supplies may be independently performed.

Figure 9:
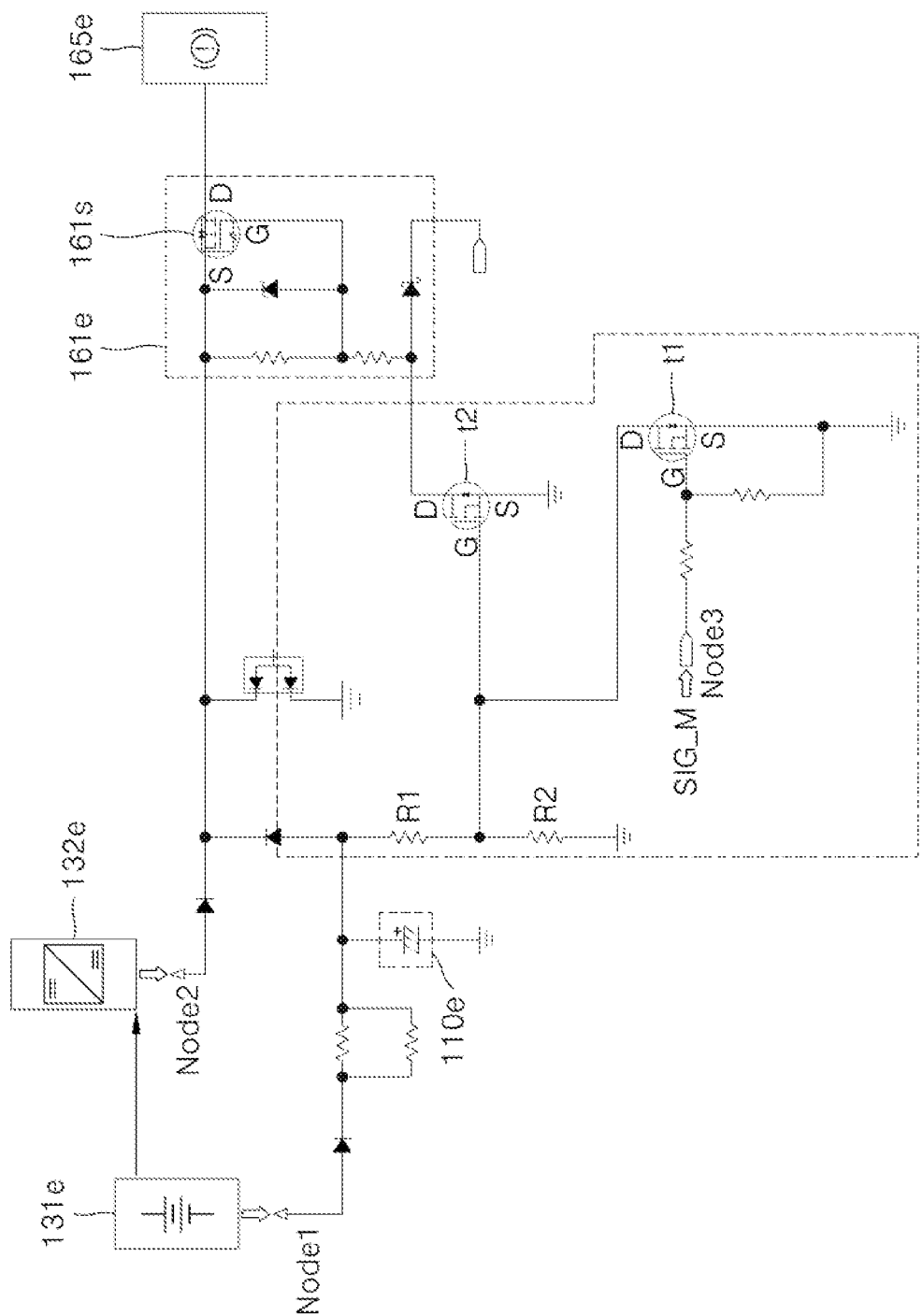
FIG. 9 illustrates a detailed configuration of a circuit for applying emergency power according to one embodiment of the present invention.

FIG. 9 illustrates a detailed configuration of a circuit for applying emergency power according to one embodiment of the present invention. The configuration of the circuit of FIG. 9 is merely an example and can be implemented in other ways.

Power of a battery 131e of a normal power supply is applied to a first node Node1 and a DC/DC converter 132e, and the DC/DC converter 132e is connected to a second node Node2. The emergency power supply 110e is implemented as a kind of capacitor and serves to store energy such that a brake 165e temporarily maintains an opened state.

A control processor 150 applies a signal SIG_M for controlling the brake to a third node Node3. When a "low" signal is applied to the third node Node3, the brake may be opened, and the robot may be moved. When a "high" signal is applied to the third node Node3, the brake may be locked, and the robot may not be moved.

Two resistors R1 and R2 are resistors which control a timing at which the brake is closed. A switch 161e connected to the brake 165e may be turned on or off according to the signal SIG_M of the third node.

Transistors t1 and t2 transmit or block a signal to control the operation of the switch 161e. According to a signal applied to a gate G, a source S and a drain D may be electrically connected or disconnected. Similarly, the switch 161e may further include a transistor 161s allowing a source S and a drain D to be electrically connected or disconnected when a signal transmitted from the transistor t1 or t2 is applied to a gate G.

Figure 10:
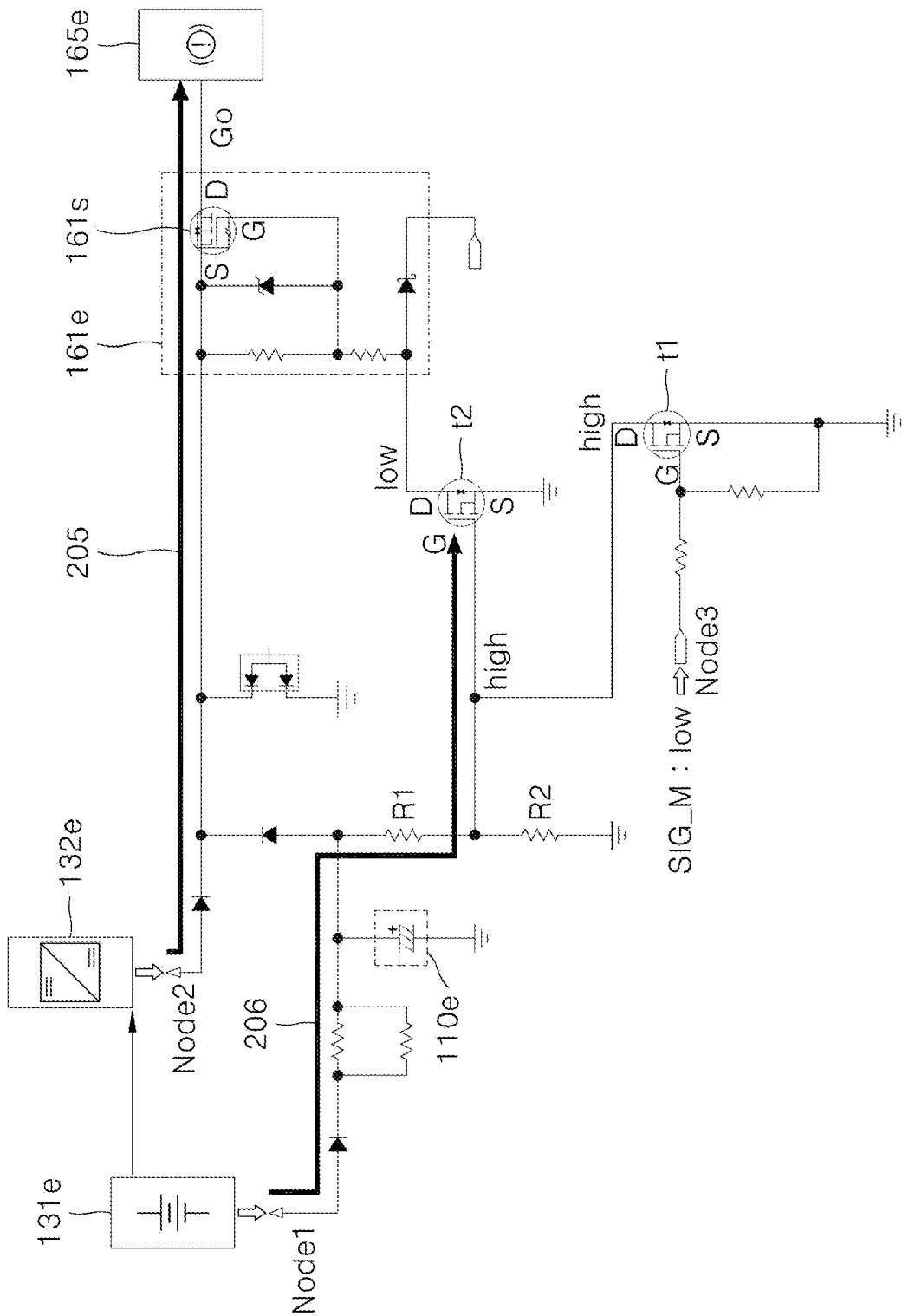
FIG. 10 is a diagram illustrating a process in which a normal power supply controls a brake according to one embodiment of the present invention.

FIG. 10 is a diagram illustrating a process in which a normal power supply controls a brake according to one embodiment of the present invention. FIG. 10 illustrates an embodiment in which the brake is allowed to be turned off, that is, a robot is allowed to be moved. Since a battery 131e of the normal power supply operates normally, power is supplied from a second node Node2 to a switch 161s (see 205). The switch 161s is turned on/off according to a value of a signal SIG_M.

Meanwhile, since the battery 131e of the normal power supply operates normally, power is supplied to a first node Node1, and in such a process, an emergency power supply 110e is charged (see 206).

When a control processor 150 applies a "low" signal to a third node Node3 to control the robot to move, a gate G of a transistor t1 is turned off. A "high" signal is applied to a terminal G of a transistor t2 and a terminal D of the transistor t1 according to a flow indicated by 206, and as a result, a "low" signal is applied to a terminal D of the transistor t2.

When a source S and a drain D of the switch 161s are electrically connected according to a "low" signal applied to a gate G of the switch 161s, power is applied to a brake 165e according to a flow indicated by 205. As a result, the robot moves while the brake maintains an opened state.

Figure 11:
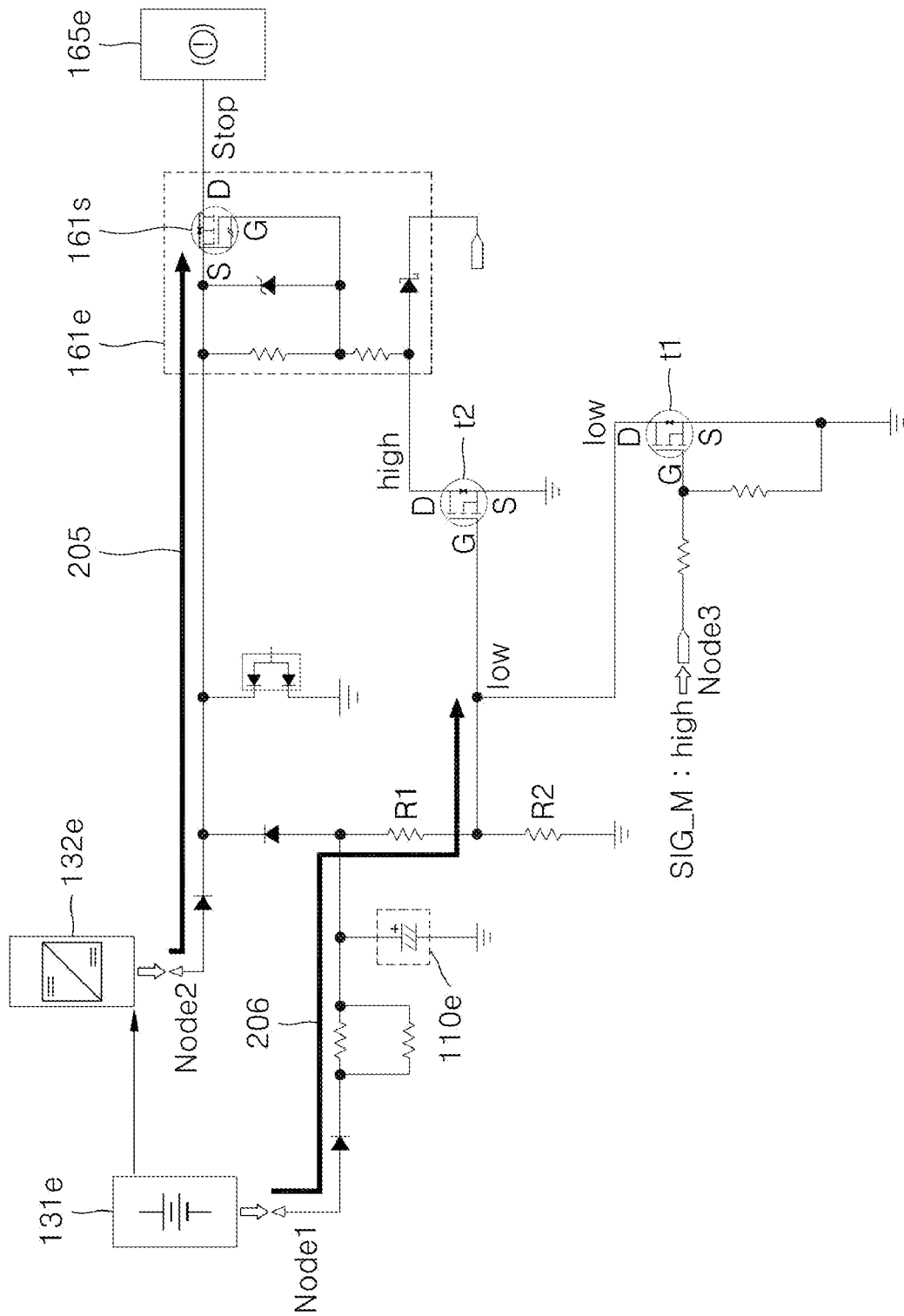
FIG. 11 is a diagram illustrating a process in which a normal power supply controls a brake according to one embodiment of the present invention.

FIG. 11 is a diagram illustrating a process in which a normal power supply controls a brake according to one embodiment of the present invention. FIG. 11 illustrates an embodiment in which the brake is allowed to be turned on, that is, a robot is allowed to be stopped. Since a battery 131e of the normal power supply operates normally, power is supplied from a second node Node2 to a switch 161s (see 205). The switch 161s is turned on/off according to a value of a signal SIG_M.

Meanwhile, since the battery 131e of the normal power supply operates normally, power is supplied to a first node Node1, and in such a process, an emergency power supply 110e is charged (see 206).

When a control processor 150 applies a "high" signal to a third node Node3 to stop the robot, a gate G of a transistor t1 is turned on. As a result, a "low" signal is applied to a terminal G of a transistor t2 and a terminal D of the transistor t1, and as a result, a "high" signal is applied to a terminal D of the transistor t2. When the "high" signal is applied to a gate G of the switch 161s, a source S and a drain D of the switch 161s are electrically disconnected, and thus power is not applied to a brake 165e (indicated by 205). As a result, the brake is locked, and the robot is stopped.

Figure 12:
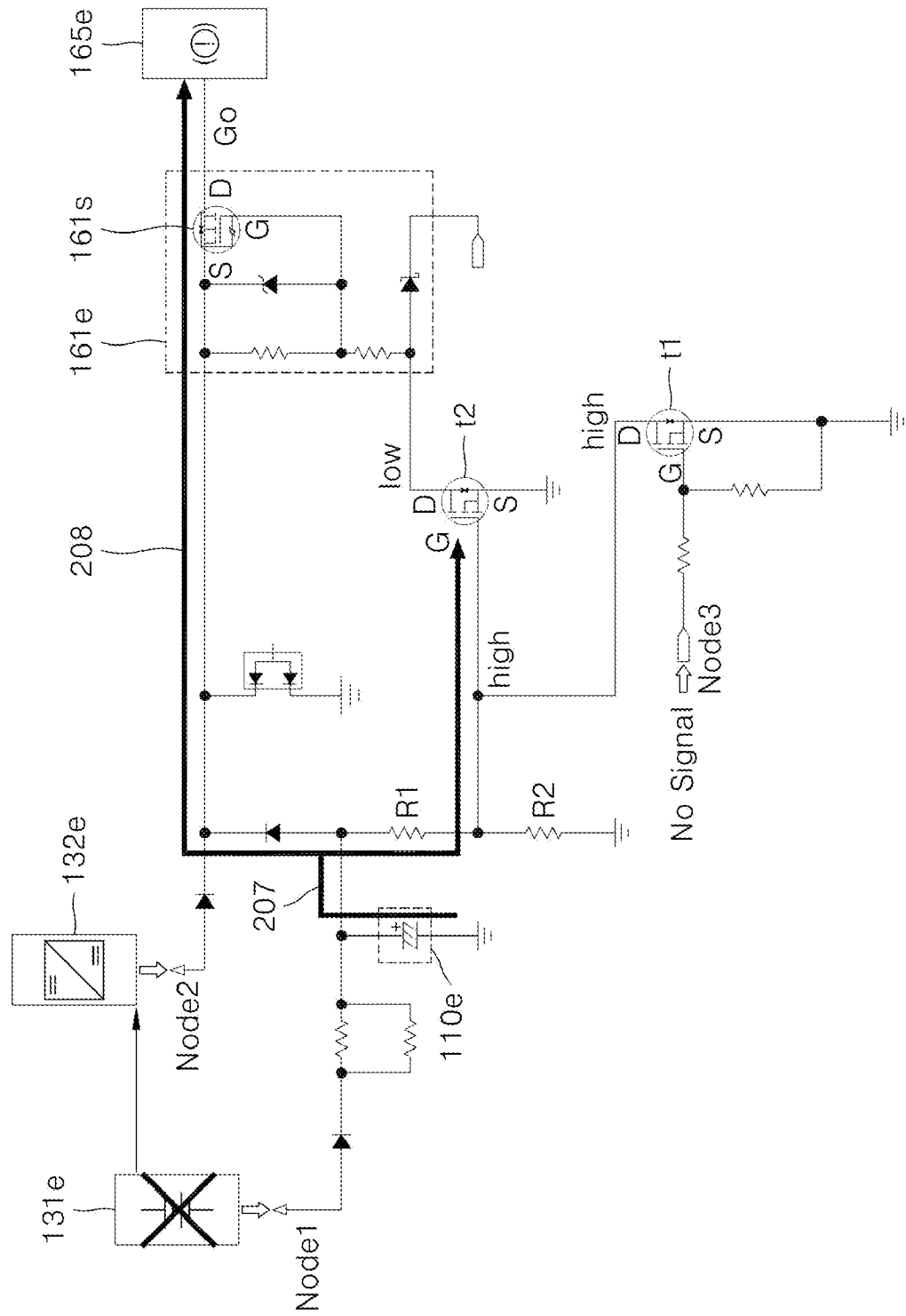
FIG. 12 is a diagram illustrating a process in which an emergency power supply controls a brake according to one embodiment of the present invention.

FIG. 12 is a diagram illustrating a process in which an emergency power supply controls a brake according to one embodiment of the present invention.

When power is not applied from a battery 131e of a normal power supply due to an abnormality in the battery 131e of the normal power supply, electrical energy charged in an emergency power supply 110e is applied (see 207). Since the battery 131e of the normal power supply fails, a separate signal is not applied from a control processor 150, and thus a third node Node3 becomes a low state. As a result, a gate G of a transistor t1 is turned off.

As a result, a "high" signal is applied to a terminal G of a transistor t2 and a terminal D of the transistor t1, and as a result, a "low" signal is applied to a terminal D of the transistor t2. Accordingly, the "low" signal is applied to a gate G of a switch 161s, a source S and a drain D of the switch 161s are electrically connected, and power is applied to a brake 165e (indicated by 208). As a result, the robot moves while the brake maintains an opened state.

Figure 13:
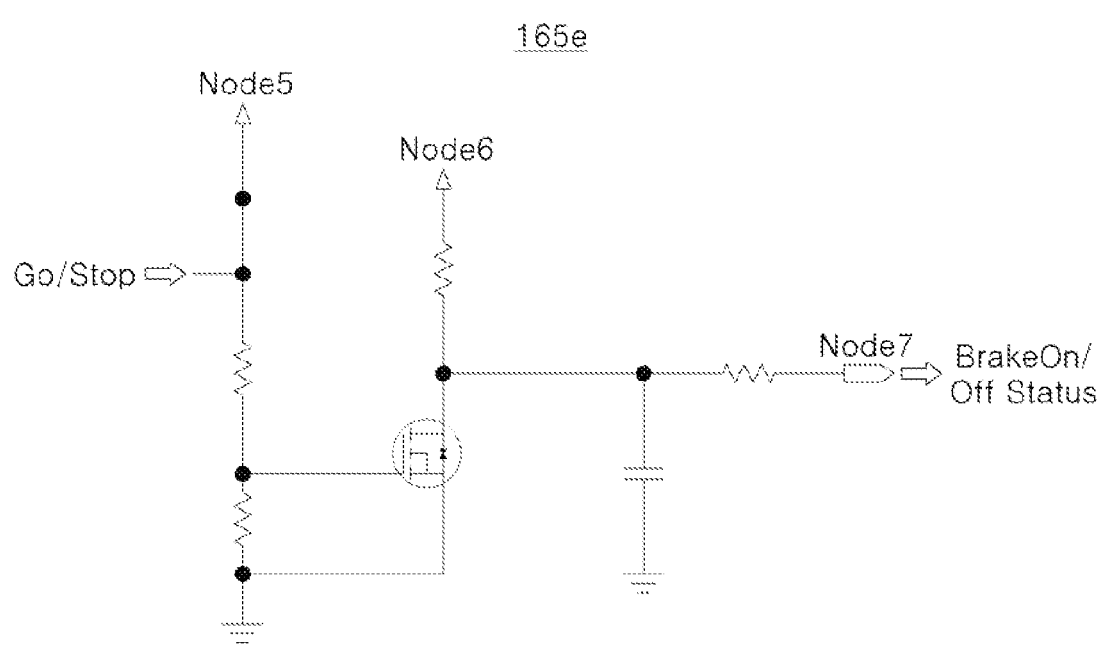
FIG. 13 is a diagram illustrating a configuration of a circuit in which a signal is transmitted to a brake according to one embodiment of the present invention.

FIG. 13 is a diagram illustrating a configuration of a circuit in which a signal is transmitted to a brake according to one embodiment of the present invention. In addition, the configuration of the circuit may be variously modified. Referring to FIGS. 9 to 12, it can be confirmed that a signal Stop for operating a brake 165e or a signal Go for opening the brake 165e is transmitted to the brake 165e according to the operation of a switch 161e.

As shown in FIG. 13, Go indicates a state in which power is applied to open the brake, and Stop indicates a state in which power is not applied to lock the brake. In the case of Go, that is, in the case of a state in which power is applied to the brake 165e from a battery 131e of a normal power supply or an emergency power supply 110e, the power controls a mechanical operation of the brake to be in an opened state through a fifth node Node5. As a result, the brake 165e may be opened, and a robot may be moved.

On the other hand, in the case of Stop, that is, in the case of a power cutoff state in which power is not applied to the brake 165e from the battery 131e of the normal power supply or the emergency power supply 110e, since power is not applied through the fifth node Node5, the brakes is locked. As a result, the brake 165e may be in a locked state, and the robot may not be moved.

Meanwhile, a voltage having a certain magnitude is applied to a sixth node Node6 to check whether the brake is operated. A control processor 150 may determine whether the brake is operating or not operating according to a magnitude of a voltage detected at a seventh node Node7.

For example, when a voltage checked at the seventh node (Node7) is a specific voltage (for example, 24 V), the control processor 150 determines that the brake is in an opened state. On the other hand, when a voltage checked at the seventh node (Node7) is a specific voltage (for example, 0 V), the control processor 150 determines that the brake is in a locked state.

FIG. 14 is a diagram illustrating a process in which a brake emergency power supply operates according to one embodiment of the present invention. A vertical axis represents a magnitude of a voltage applied to a brake, and a horizontal axis represents a time. Reference is made to FIGS. 9 to 13 above.

A graph indicated by bat represents a voltage applied by a battery 131e of a normal power supply, that is, a magnitude of a voltage of a first node Node1.

A graph indicated by mcu represents a magnitude of a signal applied by a control processor 150, that is, a magnitude of a signal applied to a third node Node3.

A graph indicated by brk represents a magnitude of a signal applied to the brake, that is, a magnitude of a voltage of a fifth node Node5. It is assumed that the brake maintains an opened state when a voltage of 24 V or higher is maintained.

Section A is a section in which a normal power supply 130 supplies power and the control processor 150 controls and cuts off power applied to a brake module 160. Since the normal power supply 130 is in a normal state, the battery 131e applies a voltage of 27 V which is higher than or equal to 24 V. When the control processor 150 applies a "high" signal (3 V), as shown in FIG. 11, power applied to the brake is cut off, and a robot is stopped. Since the graph indicated by brk represents a voltage of 0 V in section A, the brake is locked.

Meanwhile, section B is a section in which the normal power supply 130 supplies power and the control processor 150 controls and applies power to the brake module 160. Since the normal power supply 130 is in a normal state, the battery 131e applies a voltage of 27 V which is higher than or equal to 24 V.

When the control processor 150 applies a "low" signal (0V) as indicated by mcu, as described with reference to FIG. 10, power is applied to the brake, and the robot is moved. Since the graph indicated by brk indicates a voltage of 24 V in section B, the brake is opened.

Meanwhile, section C (starting from a time point of 0.5 s) is a section in which an emergency power supply 110 supplies power because the normal power supply 130 fails to supply power. The control processor 150 also cannot control the brake module 160 due to a failure of the battery 131e of the normal power supply 130, and a "low" signal (0 V) is applied as indicated by mcu (see FIG. 12).

Since the normal power supply 130 is in a faulty state, the battery 131e applies a voltage of 0 V. Electrical energy charged in the emergency power supply 110 operates the brake. In section C, a graph indicated by brk represents a magnitude of a voltage applied to the brake, that is, represents that power charged in the emergency power supply 160 is applied and gradually decreased.

A time point at which the brake is locked due to power of the emergency power supply 110 is a time point (0.8 s) at which an operating voltage of the brake becomes a lowest voltage (that is, 12 V). As a result, the brake maintains an opened state for about 0.3 s from 0.5 s at which the normal power supply 130 fails, and then locks at a time point of 0.8 s. Therefore, locking of the brake of the robot is held for a certain time to prevent the robot from overturning.

When the embodiments of the present invention are applied, without needing to monitor a battery, a storage battery, or a capacitor, charged electricity can be transmitted to a brake immediately when a battery fails, and thus the brake can be maintained in an opened state for a short time, thereby solving a problem of a robot overturning due to sudden locking of the brake due to a power supply problem.

Although it has been described above that all the components constituting embodiments of the present invention are combined into one component or are operated in combination, the present invention is not necessarily limited to the embodiments. That is, all the components may operate by selectively combining one or more components without departing from the scope of the present invention. In addition, each of all the components may be implemented with independent hardware, or a part or all of each of the components may be selectively combined and thus implemented with a computer program having program modules which perform some or all of combined functions in one or more pieces of hardware. Codes and code segments constituting the computer program may be easily inferred by those skilled in the art. The computer program is stored in a computer-readable recording medium and read and executed by a computer, thereby implementing the embodiments of the present invention. The recording medium of the computer program may include magnetic recording media, optical recording media, and storage media including a semiconductor recording element. Also, a computer program for implementing an embodiment of the present invention may include a program module that is transmitted in real time via an external device.

Although embodiments of the present invention have been described, various modifications and variations may be made by those skilled in the art. Accordingly, it is to be understood that such variations and modifications are included within the scope of the present invention.

The invention claimed is:

1. A robot comprising:
    a motor;
    a normal power supply configured to supply electrical energy for moving and operating the robot by the motor;
    a brake module configured to:
        brake the motor, or
        release a braking of the motor;
    an emergency power supply configured to:
        to be charged by the electrical energy from the normal power supply, and
        supply the charged electrical energy to the brake module when a supply of the electrical energy to the emergency power supply from the normal power supply is stopped; and
    a control processor configured to apply a signal for controlling the supply of electrical energy from the emergency power supply to the brake module and for controlling movement and operation of the robot.

2. The robot of claim 1, further comprising an environment determiner configured to control the supply of electrical energy from the emergency power supply to the brake module.

3. The robot of claim 2, wherein:
    the environment determiner stores a magnitude of a counter electromotive force of the motor; and
    based on the magnitude of the counter electromotive force being greater than or equal to a set reference, the environment determiner turns off a switch disposed between the brake module and the emergency power supply.

4. The robot of claim 2, comprising at least one of a camera unit configured to photograph a periphery of the robot or a sensing device configured to detecting an obstacle within a predetermined distance from the robot, wherein:
    the control processor stores information, which is for instructing immediate braking of the robot using data generated by the camera unit or the sensing device, in the environment determiner; and
    the environment determiner turns on or off a switch disposed between the brake module and the emergency power supply according to the stored information.

5. The robot of claim 2, wherein the environment determiner receives an electrical energy from the emergency power supply.

6. The robot of claim 1, wherein:
the normal power supply includes a battery and a direct current (DC)/DC converter;
the emergency power supply is charged by the battery;
the brake module includes a first switch and a brake;
in the first switch, a wire to which the DC/DC converter and the emergency power supply are coupled is connected to a first terminal, and a wire to which the brake is coupled is connected to a second terminal; and
the switch is turned on or off according to a control signal from the control processor to electrically connect or disconnect the first terminal and the second terminal.

7. The robot of claim 6, wherein the first switch or a second switch connected directly to the emergency power supply is turned on or off according to a signal generated from environment information of the robot confirmed at a time point at which the supply of the electrical energy from the normal power supply is stopped.

8. The robot of claim 1, comprising:
an environment determiner configured to output a signal generated from environment information of the robot confirmed at a time point at which the supply of the electrical energy from the normal power supply is stopped;
a first switch including a first terminal through which the electrical energy is input from the normal power supply and a second terminal through which electrical energy of the first terminal is output or blocked according to the signal output from the environment determiner;
an OR gate configured to output the electrical energy output from the normal power supply and the electrical energy output from the second terminal of the first switch according to an OR operation;
a level shift configured to receive the electrical energy output from the OR gate;
an AND gate configured to output a signal output from the level shift and a signal output from the control processor according to an AND operation; and
a second switch turned on or off according to the signal output from the AND gate and configured to transmit the electrical energy output from the OR gate to a brake of the brake module.

9. The robot of claim 1, further comprising:
a moving device that includes four wheels for operating in a four-wheel drive,
wherein the motor comprises four motors, each attached to a respective one of the four wheels and configured to rotate the respective one of the four wheels of the robot, and
wherein the brake module brakes at least one of the four motors or releases breaking of the at least one of the four motors.

10. The robot of claim 9, wherein:
the brake module comprises at least a first brake module and a second brake module,
the emergency power supply comprises at least a first emergency power supply and a second emergency power supply,
braking of a first wheel among the four wheels is controlled by the first brake module, and the first brake module is electrically connected to the first emergency power supply;
braking of a second wheel among the four wheels is controlled by the second brake module, and the second brake module is electrically connected to the second emergency power supply; and
the first emergency power supply and the second emergency power supply independently supply electrical energy to the first brake module and the second brake module.

11. A brake control device comprising:
a battery;
a capacitor charged by the battery;
a brake module configured to receive electrical energy from the battery or the capacitor to brake a motor or release braking of the motor;
an OR gate which includes a first terminal through which the electrical energy is input from the battery and a second terminal through the electrical energy is selectively input from the capacitor and outputs the electrical energy applied by the battery or the capacitor according to an OR operation;
an environment determiner configured to output a signal generated from environment information confirmed at a time point at which supply of the electrical energy from the battery is stopped;
a first switch configured to selectively transmit the electrical energy of the capacitor to the second terminal according to the signal output from the environment determiner;
a level shift configured to receive the electrical energy output from the OR gate;
an AND gate configured to output a signal output from the level shift and a signal output from a control processor according to an AND operation; and
a second switch turned on or off according to the signal output from the AND gate and configured to transmit the electrical energy output from the OR gate to a brake of the brake module.

12. The brake control device of claim 11, wherein:
the environment determiner stores a magnitude of a counter electromotive force of the motor; and
when the magnitude of the counter electromotive force is greater than or equal to a set reference, the environment determiner turns the first switch off.

13. The brake control device of claim 11, wherein:
the brake control device is configured to be installed in a robot that includes at least one of a camera unit configured to photograph a periphery of the robot or a sensing device configured to detecting an obstacle within a predetermined distance from the robot;
the environment determiner stores information for instructing immediate braking of the robot using data generated by the camera unit or the sensing device; and
when the information for instructing the immediate braking is true, the environment determiner turns the first switch off.

14. The brake control device of claim 11, wherein the environment determiner receives the electrical energy from the capacitor.

* * * * *